United States Patent [19]
Kakuda et al.

[11] Patent Number: 6,062,695
[45] Date of Patent: May 16, 2000

[54] PROJECTION TYPE LIQUID CRYSTAL DISPLAY DEVICE

[75] Inventors: Takashi Kakuda, Yokohama; Satoshi Ouchi, Kamakura; Masahiko Yatsu, Fujisawa; Naohiro Ozawa, Hiratsuka; Yutaka Matsuda, Fujisawa; Takuya Shiaki, Sagamihara, all of Japan

[73] Assignee: Hitachi, Ltd., Tokyo, Japan

[21] Appl. No.: 09/088,838

[22] Filed: Jun. 2, 1998

[30] Foreign Application Priority Data

Jun. 3, 1997 [JP] Japan ................................. 9-144909

[51] Int. Cl.⁷ .................................................. G03B 21/14
[52] U.S. Cl. ...................................... 353/38; 353/20; 349/9
[58] Field of Search ................................. 353/20, 31, 34, 353/37, 38; 349/8, 9; 359/487, 488, 494, 495

[56] References Cited

U.S. PATENT DOCUMENTS

| | | | |
|---|---|---|---|
| 5,283,600 | 2/1994 | Imai | 353/20 |
| 5,359,455 | 10/1994 | Oishi | 349/9 |
| 5,418,583 | 5/1995 | Masumoto | 353/38 |
| 5,601,351 | 2/1997 | Van Den Brandt | 353/20 |
| 5,662,401 | 9/1997 | Shimizu et al. | 353/38 |
| 5,764,412 | 6/1998 | Suzuki et al. | 353/20 |
| 5,833,341 | 11/1998 | Kimura et al. | 353/98 |
| 5,865,521 | 2/1999 | Hashizume et al. | 353/20 |
| 5,898,521 | 4/1999 | Okada | 353/20 |

Primary Examiner—William Dowling
Attorney, Agent, or Firm—Frohwitter; R. William Beard, Jr.

[57] ABSTRACT

A projection type liquid crystal display device, including: irradiation means having a function of irradiating light emitted from a light source upon an irradiated surface; a liquid crystal display element for modulating the light; and projection means for projecting the light emitted from said liquid crystal display element, wherein said irradiation means comprises: at least one reflection mirror; a polarization beam splitter for dividing the light from the light source into P polarization light and S polarization light; a $\lambda/2$ phase shifting plate for rotating a direction of polarization of either one of the P polarization and S polarization lights; polarization means being constructed with a reflection mirror for reflecting either one of the P polarization and S polarization lights; a first lens array being constructed with a plurality of condenser lenses, for collecting the light emitted from said polarization means so as to form a plurality of secondary light source images; and a second lens array being constructed with a plurality of condenser lenses and positioned in vicinity of where the plurality of secondary light source images are formed.

15 Claims, 6 Drawing Sheets

FIG. 7 (a)
FIG. 7 (b)
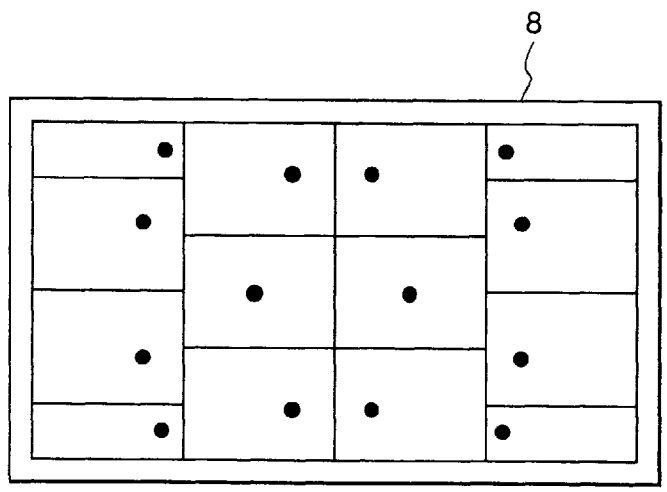
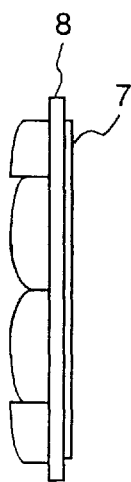
FIG. 7 (c)
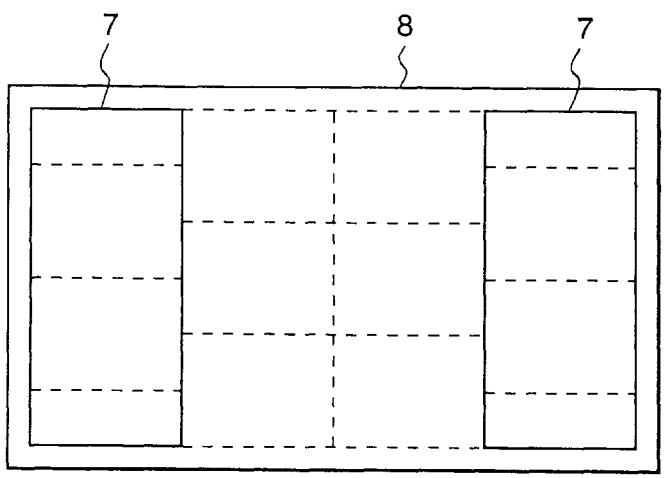

FIG. 8 (a)
FIG. 8 (b)
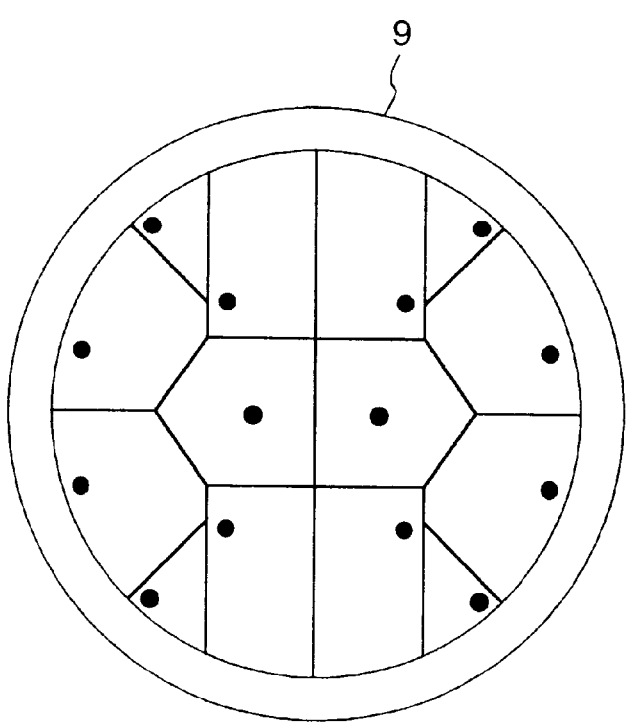
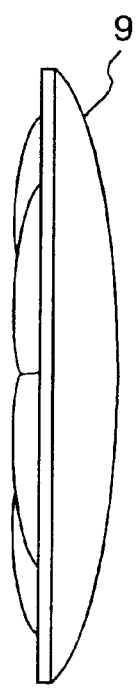

PROJECTION TYPE LIQUID CRYSTAL DISPLAY DEVICE

BACKGROUND OF THE INVENTION

1. Field of the Invention

The present invention relates to a projection type display device which uses a liquid crystal display element therein.

2. Description of the Prior Art

Conventionally, as an device for displaying a picture or a screen thereon, there is already known a display device, such as so-called a projection type liquid crystal display device in which an optical image, being formed as changes in optical characteristics depending on a picture signal upon a light bulb being composed of the liquid crystal display element, is irradiated by light emitted from an irradiation means so as to project an enlarged picture on a screen. In a liquid crystal display element of twisted nematic (TN) type as a one example of the representative thereof, two (2) pieces of polarization plates are positioned in front and rear of a liquid crystal cell, which is composed of a pair of transparent substrates having transparent film electrodes formed thereon and the liquid crystal put into between them, in such a manner that the polarization plates are different to each other by an angle of 90° in a polarization direction thereof, thereby displaying an image information through controlling the penetrating amount of the light in the incident light therethrough, by combining a function of rotating the plane of polarization due to electro-optic effect of the liquid crystal and a function of selecting polarization component on the polarization plate. In recent years, on the liquid crystal display element of such a transparent type and/or a reflection type, there has been made great and rapid advances in miniaturization or small-sizing of the element itself, as well as in an improvement of performance or capacity, especially in the power of resolution thereof. Therefore, the display device using such the liquid crystal display element also has been advanced in the small-sizing and for the high performance thereof, and, not only for displaying an image by a video signal and so on, as is used in the conventional art, but also a liquid crystal display device of such a projection type is newly proposed for use as a display device for outputting a picture thereon in a personal computer. For such a sort of display device, in particular, the projection type liquid crystal display device, there are requirements that it is small in size, and that a picture which can be obtained on it is bright even in every corner thereof. However, with the projection type liquid crystal display devices of the conventional art, there are problems that it is still large in the size, and that the performance, including such as brightness of the picture which can be finally obtained thereby is not yet sufficient.

For reduction in size of the display device as a whole, small-sizing of the light bulb, i.e., of the liquid crystal display element itself is effective, however, if the liquid crystal display element is small-sized, there are caused such problems that a ratio of a luminous flux amount upon the liquid crystal display element with respect to a total luminous flux amount emitted by a light source (hereinafter, it is called by "an efficiency in light utilization") comes to be low, since an irradiation area where is irradiated by an irradiating means is small, and that peripheral portion of the picture is dark, etc. Further, the liquid crystal display element can only use a polarization light which is polarized in one direction, therefore, only a half of the light can be utilized from a light source emitting light beam of random polarization.

As a means for obtaining a picture which is bright in every corner thereof, there is already known an integrator optic system which uses two (2) pieces of lens arrays, as is disclosed, for example, in Japanese Patent Laying-Open No. Hei 3-111806 (1991). In this integrator optic system, the light emitted from the light source is divided by a plurality of collecting (or condenser) lenses each having a rectangular opening shape and constructing a first lens array, and the emitted lights of the rectangular opening shape are superposed on an irradiation surface (the liquid crystal display element) so as to build up an image by means of a second lens array which is constructed with collecting (condenser) lenses corresponding to the each collecting lens of rectangular opening shape. With this optic system, it is almost possible to uniform distribution in intensity of the light irradiating the liquid crystal display element.

On a while, as an another optical system in which the random polarization light from the light source is once arranged or lined up in a single polarization direction and then is irradiated upon the liquid crystal display device, there is already known a system, as is disclosed, for example, in Japanese Patent Laying-Open No. Hei 4-63318 (1992), in which the random polarization light emitted from the light source is divided into P polarization light and S polarization light by use of a polarization beam splitter and then they are combined by use of a prism.

However, in order to increase the brightness in the conventional integrator optical system, the lens array(s) must be large in the size thereof, therefore, if trying to make the projection type liquid crystal display device small in the size, the brightness is decreased down. Further, even in the optical system using the polarization light beam splitter, if it is made small in the size, the brightness is also decreased down. As a result of this, it is difficult to realize the small-sizing of the device, as a whole, as well as improving the performance in such as the brightness at the same time. Furthermore, in particular in case of the projection type liquid crystal display device, because the various factors can give an effect on property of the picture in quality, including such as the optical characteristic of a projection lens other than the irradiation means mentioned in the above and the optical characteristic of the liquid crystal display element, etc., it is difficult to obtain a display device of small-sized and of showing a good performance in the picture quality, even if only the irradiation means is improved.

SUMMARY OF THE INVENTION

An object of the present invention is, therefore, dissolving the drawbacks of the conventional arts mentioned in the above, to provide a projection type liquid crystal display device of small-sized and of showing high performances.

According to the present invention, there is provided a projection type liquid crystal display device, including:

irradiation means having a function of irradiating a light emitted from a light source upon an irradiated surface;

a liquid crystal display element for modulating the light; and projection means for projecting the light emitted from said liquid crystal display element, wherein said irradiation means comprises:

at least one reflection mirror;

a polarization beam splitter for dividing the light from the light source into P polarization light and S polarization light;

a $\lambda/2$ phase shifting plate for rotating direction of polarization of either one of the P polarization light and the S polarization light;

polarization means being constructed with a reflection mirror for reflecting either one of the P polarization light and the S polarization light;

a first lens array being constructed with a plurality of condenser lenses, for collecting the light emitted from said polarization means so as to form a plurality of secondary images of the light source; and a second lens array being constructed with a plurality of condenser lenses and positioned in vicinity of where the plurality of secondary images of the light source are formed.

With such the construction, by using a liquid crystal display element of small-sized, it is possible to provide the projection type liquid crystal display device which is small in the size, as a whole device thereof, as well as to realize the projection type liquid crystal display device which can provide a picture which is bright and is also uniform in the quality all over the screen thereof, thereby accomplishing the above-mentioned object with ease.

BRIEF DESCRIPTION OF DRAWINGS

FIGS. 7(a), (b) and (c) are views of showing shape of a first lens array in the embodiment of the projection type liquid crystal display device according to the present invention;

FIGS. 8(a) and (b) are views of showing shape of a second lens array in the embodiment of the projection type liquid crystal display device according to the present invention.

DETAILED DESCRIPTION OF PREFERRED EMBODIMENTS

Hereinafter, embodiments according to the present invention will be fully explained by referring to the attached drawings.

Figure 1:
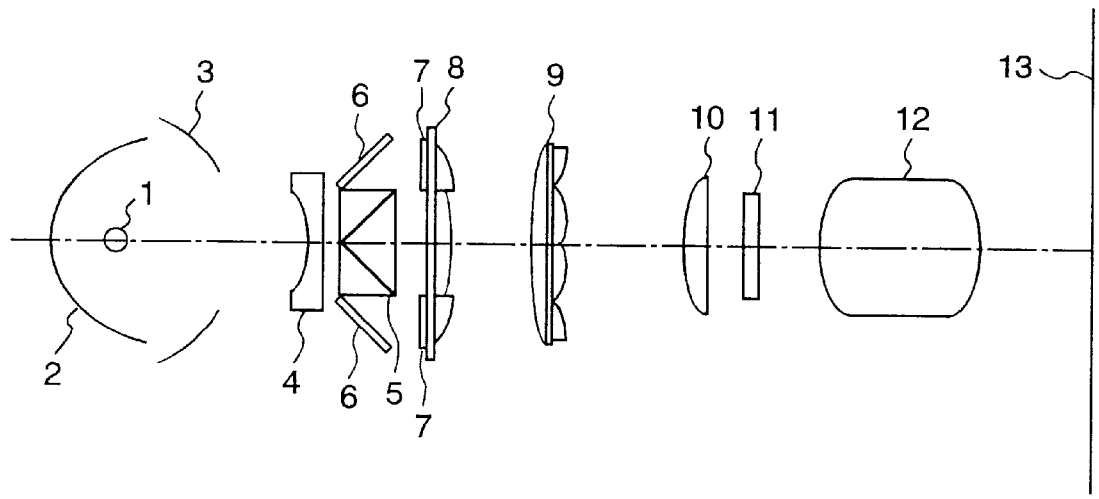
FIG. 1 is a view of showing a construction of an optical system of the projection type liquid crystal display device according to the present invention.

FIG. 1 is a view of showing a construction of an optical system of a projection type liquid crystal display device according to the present invention. In FIG. 1, a light source 1 is a white lamp, including a metal halide lamp, a xenon lamp, a halogen lamp, etc. Rays of light which are emitted or radiated from the light source 1, reflecting upon a mirror 2 of an oval or elliptical spherical shape and upon a mirror 3 of a spherical shape, come to be rays in parallel through a collimator lens 4 having a negative refraction power to be entered into a polarization beam splitter 5. The incident light is divided by the polarization beam splitter 5 into two, i.e., the light penetrating through it into a P polarization light and the light reflecting upon it into a S polarization light. The P polarization light is then entered into a first lens array 8, and the S polarization light is into a total reflection mirror 6. The S polarization light reflects upon the surface of the total reflection mirror 6 and enters into the first lens array 8. After passing through the first lens array 8, the P polarization light further passes through a second lens array 9, and then enters into a condenser lens 10. The S polarization light is rotated by an angle of 90 degree through a $\lambda/2$ shifting plate 7, which is positioned at an incident side surface of the first lens array 8, to be turned into the P polarization light, and then enters into the condenser lens 10 passing through the second lens array 9. The condenser lens 10 has a positive refraction power, thereby, shows a function of further collecting the P polarization light, and the light passing through the condenser lens 10 irradiates the liquid crystal display element 11. At the incident side surface of the liquid crystal display element 11, there is positioned a polarization plate for penetrating or passing through the P polarization light. In the projection type liquid crystal display device according to the conventional art, since the polarization light directed in only one polarization direction can pass through the liquid crystal display element 11, an amount of the light beam passing through it comes to be a half (½). However, in accordance with the present invention, since the light beam of random polarization directions emitted from the light source 1 are once lined up in one polarization direction to be entered into the liquid crystal display element 11, therefore, brightness or luminous intensity is as two times large as in the conventional projection type liquid crystal display device, theoretically. The light passing through the liquid crystal display element 11 further penetrates a projection means 12 composed of such as of a zoom lens, and arrives at a screen 13. The picture formed on the liquid crystal display element is enlarged and projected upon the screen through the projection means 12, thereby achieving the function as the display device.

Next, explanation will be given on the functions of the main portions of the projection type liquid crystal display device according to the present invention.

Figure 2:
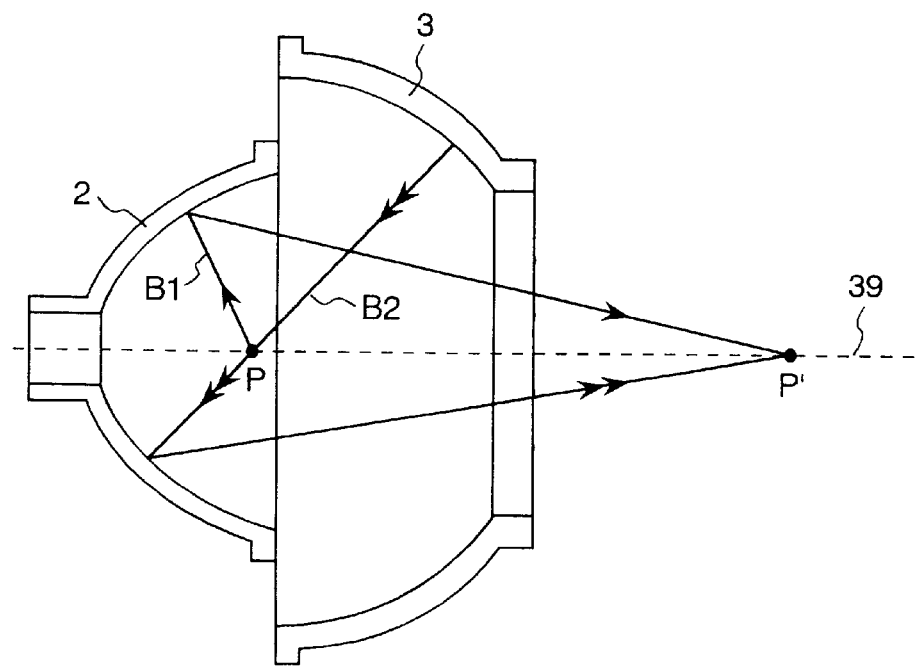
FIG. 2 is an explanatory view of explaining principle of main portions of the projection type liquid crystal display device according to the present invention.

FIG. 2 is an explanatory view of explaining principle of the irradiation means in the projection type liquid crystal display device according to the present invention, in which there is shown a manner how the light emitted from the light source is reflected upon the surfaces of the elliptical mirror 2 and the spherical mirror 3. In the same figure, points P and P' indicate the positions of a first focus point and a second focus point of the elliptical reflection surface of the elliptical mirror 2, respectively. The light beam BI emitted into a direction of the elliptical mirror 2 from the point P is reflected upon the elliptical mirror 2 and reaches to the point P' on an optical axis 39 thereof. Accordingly, all the light rays which are emitted from the point P and reflected directly upon the elliptical mirror 2 reaches to the point P. While, if the center of the spherical surface, i.e., that of the reflection surface of the spherical mirror 3 is coincident with the point P, the light beam B2 which is ejected into the direction of the spherical mirror 3 from the point P is reflected upon the spherical mirror 3 and comes back to the point P again. Then, it is directed toward the elliptical mirror 2 and reaches to the point P' after being reflected thereupon. Due to those functions, theoretically, all the light beams, which are emitted from the point P and directed into the elliptical mirror 2 and the spherical mirror 3, reach to the point P'. The light beam B2 does not reach to the irradiated surface of such the liquid crystal display element, in the construction of the conventional art, on the contrary to this, in accordance with the construction shown in FIG. 2, the efficiency in light utilization can be improved by providing the liquid crystal display element which is positioned in the vicinity of the point P'. However, even in this construction, if trying to improve the efficiency in light utilization by means of only the reflection mirror such as the elliptical mirror 2, as in the conventional irradiation means, the reflection mirror becomes large in the size thereof, and accompanying to this, there are causes the problem that the projection lens comes to be large in the size thereof, since a projection lens having a small F value is necessary as the projection means.

Figure 3:
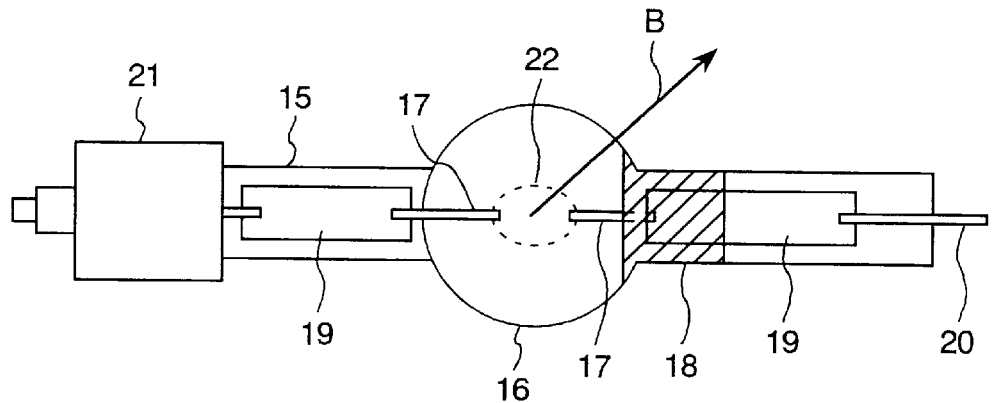
FIG. 3 is a view of showing an embodiment of the light source in the projection type liquid crystal display device according to the present invention.

FIG. 3 is a view of showing an embodiment of the light source in the projection type liquid crystal display device according to the present invention. In FIG. 3, there is disclosed a lamp 15 as an example of the light source 1 mentioned in the above. In the figure, a reference numeral 16 indicates a light-emitting tube made of, such as quartz glass, inside of which is sealed or enclosed a gas, such as mercury, argon, etc., for giving a function as a metal vapor discharge lamp. Further, reference numerals 17 in the figure indicates electrodes, 18 a film for heat-retention, 19 foils or thin films of molybdenum having a function of keeping the light-emitting tube 16 in air-tight condition, 20 a reed wire, and 21 a base, wherein the light beams are emitted or radiated from a light-emission portion 22 due to discharge between the pair of the electrodes 17. Here, the heat-retention film 18, which is made of for example zirconium, etc., has a function of retaining the temperature of the light-emitting tube, thereby keeping the vapor pressure therein at high and so on, so as to obtain a lamp showing continuous and sufficient light-emitting capacity, and a long life as well. However, a portion of the light, which is emitted from the light-emission portion 22 and enters into the heat-retention film 18, is absorbed, diffused and reflected thereon, therefore, the irradiation means using the conventional lamp, on which the heat-retention film is applied or painted over a wide area thereon, has a bad efficiency in light utilization. With the construction of the present invention, in case where the lamp 15 as shown in FIG. 3 is used, the heat-retention film 18 is provided on an area fitting to the shape of the above-mentioned spherical mirror 3. Namely, the shape the heat-retention film 18 is so determined that the light beam B emitted from the light-emission portion 22 shown in FIG. 3 can enters into the spherical mirror 3 shown in FIG. 2, directly, without being absorbed or reflected thereby. With this, the irradiation means combining the lamp 15 and the structure shown in FIG. 2 can afford to utilize the light effectively for irradiation, though it is absorbed or reflected by the heat-retention film 18 in the conventional structure, thereby improving the efficiency in utilization of the light. On the other hand, in case where the lamp is provided in such a manner that the light-emission portion 22 thereof is positioned in the vicinity of the point P in FIG. 2, as mentioned in the above, the incident light, which is emitted from the light-emission portion 22 and directed to the above-mentioned spherical mirror 3, is reflected and turned back into the direction of the light-emission portion. Therefore, the light reflected by the spherical mirror 3 hits upon the light-emitting tube 16 of the lamp, thereby causing the effect of maintaining the temperature and the vapor pressure at high and so on therein. Namely, the spherical mirror 3 has the function which is same or equivalent to that of the conventional heat-retention film. Consequently, by combining the construction of the reflection mirror shown in FIG. 2 with the lamp shown in FIG. 3, it is possible to obtain the irradiation means showing a high efficiency in light utilization without deteriorating the light-emission capacity and the life thereof, even if the application area of the heat-retention film is made small.

However, with the construction according to the present invention, in case whrere the spherical mirror 3 has a good efficiency in returning the light back to the lamp, so that a sufficient light emission capacity and an enough span of life can be obtained therewith, the above-mentioned heat-retention film 18 can be removed. Further, in order to let the spherical mirror 3 have a same function as the conventional heat-retention film 18, the reflecting surface of the spherical mirror is preferably to be a reflection layer which is formed by aluminum evaporation method, etc., rather than such the dichroic mirror which reflects only visible component of the light in the area thereof.

Next, an explanation will be given on the function of the polarization means in accordance with the present invention.

Figure 4:
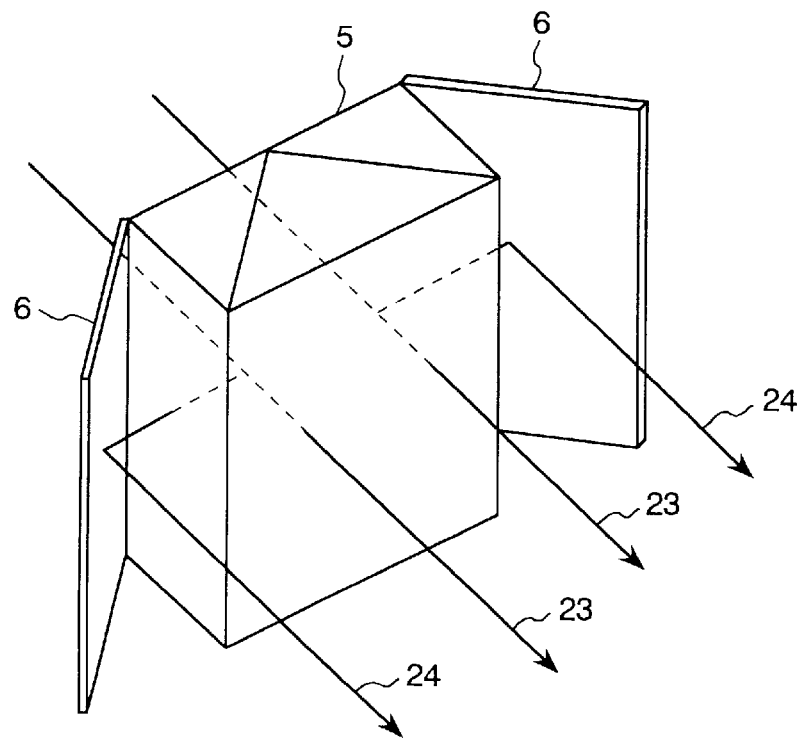
FIG. 4 is a view of showing a polarization means in the projection type liquid crystal display device according to the present invention.

FIG. 4 is a general view of showing the function of the polarization means according to the present invention. As is shown in FIG. 4, the polarization means according to the present invention is constructed by a polarization beam splitter 5 which is composed of a cubic prism composition being provided with polarization separation films inside thereof, and two (2) pieces of total reflection mirrors 6 being provided therewith. Though the polarization beam splitter 5 is constructed with three (3) pieces of prisms as shown in FIG. 4, it should not be restricted to this. The first lens array 8 is made of four lines of lenses aligned in the horizontal direction, each of them being equal in width. The width of the prism is as two times large as that of the first lens array 8, and the total reflection mirrors 6 are positioned with declining by an angle of 90 degree with respect to the optical axis of the irradiation means, respectively. The side width of the radiation surface is equal to that of the first lens array 8, however, it should not be restricted to only this.

Next, an explanation will be given on the function of the polarization means according to the present invention, by referring to FIGS. 1 and 4.

The light beams emitted from the light source 1 are reflected upon the elliptical mirror 2 and the spherical mirror 3, and come to be in parallel through the collimator lens 4 having a negative refraction power, to be entered into the polarization beam splitter 5. The incident light is divided by the polarization beam splitter 5 into two, i.e., the penetrating light into P polarization light 23 and the reflection light into S polarization light 24. The P polarization light rays enter into the first lens array 8 and the S polarization light rays direct into the total reflection mirrors 6. The S polarization light rays 24 reflect upon the respective total reflection mirrors 6 and enter into the first lens array 8, and then they are rotated by an angle of 90 degree in the polarization direction thereof by means of the $\lambda/2$ phase shifting plate 9 which is positioned at the incident side surface of the first lens array 8.

As mentioned in the above, the P polarization light 23 and the S polarization light 24, which are divided by the polarization means, irradiate upon the surfaces of the rectangular opening shape, respectively, with good efficiency.

Next, an explanation will be given on the function of the first and second lens arrays according to the present invention.

Figure 5:
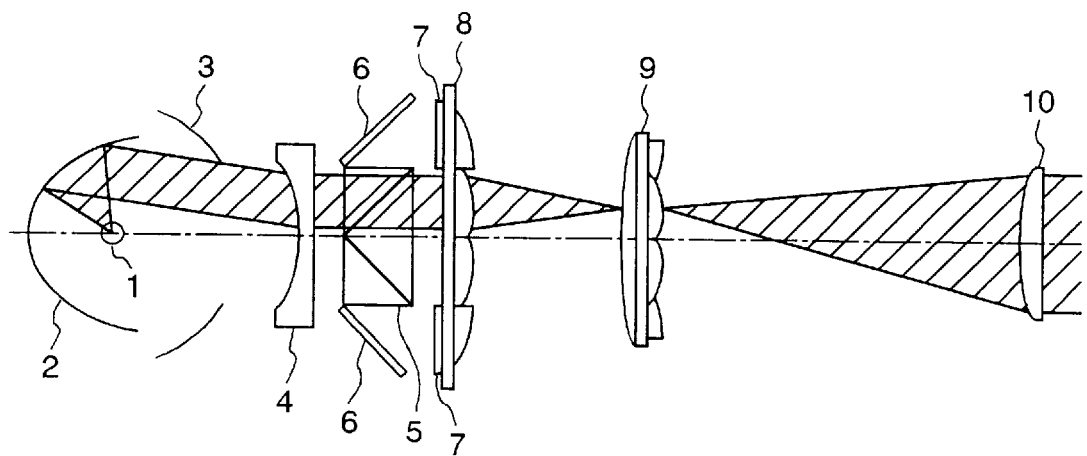
FIG. 5 is an explanatory view of explaining principle of important portions of the projection type liquid crystal display device according to the present invention.
Figure 6:
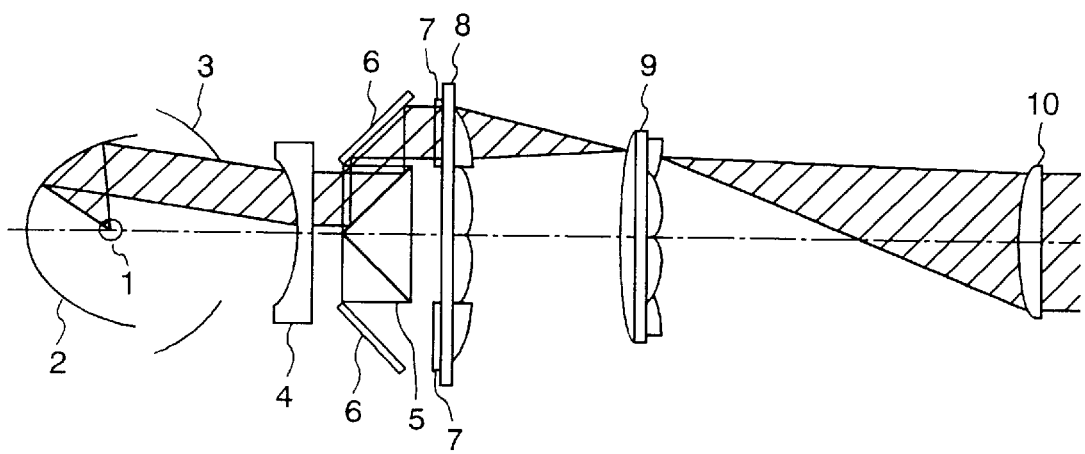
FIG. 6 is an explanatory view of explaining principle of important portions of the projection type liquid crystal display device according to the present invention.

FIGS. 5 and 6 are cross-sectional views for showing the principle in the functions of the lens arrays of the irradiation means, according to the present invention. FIG. 5 is for showing the principle of the lens array of the irradiation means according to the present invention, with respect to the P polarization light 23 penetrating through the polarization beam splitter 5. In the irradiation means as shown in FIG. 5, the light beams radiated from the light source 1 are reflected by the elliptical mirror 2 and the spherical mirror 3, respectively, and come to be in parallel through the collimator lens 4 having the negative refraction power, so as to be entered into the polarization beam splitter 5. The incident light is divided by the polarization beam splitter 5 into two, i.e., the penetrating light into P polarization light 23 and the reflection light into the S polarization light 24, respectively. Then, the P polarization light 23 enters into the first lens array 8. At the same time, the first lens array 8 is so set that an image of the light emission portion of the light source 1 is formed at the position of the second lens array 9, thereby the width of luminous flux passing through the second lens array 9 is made small or narrow. As a result of this, it has a function of increasing the proportion of an amount of the light which passes through the second lens array 9. Further, the second lens array 9 has the same number of lenses to those of the first lens array 8, corresponding to each of the lenses constructing it, respectively, and the those lenses on the second lens array 9, corresponding to them respectively, have a function of piling up and forming the images of the respective rectangular opening shapes of the lenses on the first lens array 8 on the liquid crystal display element 11. As a result of this, a shape of the light which irradiates the liquid crystal display element 11 comes to be a rectangular in shape, thereby, almost flattening the distribution in intensity of the light over the region of the picture, increasing the ratio in illuminance at peripheral region of the picture with respect to the central region thereof so as to prevent the peripheral region of the picture from becoming dark, and realizing a picture being bright and clear over a whole screen.

FIG. 6 is a principle view of the lens array of the irradiation means in accordance with the present invention, with respect to the S polarization light 24 reflecting upon the polarization beam splitter 5. In the irradiation means shown in FIG. 6, the light beams being radiated from the light source 1 are reflected by the elliptical mirror 2 and the spherical mirror 3, respectively, and come to be in parallel through the collimator lens 4 having a negative refraction power, so as to be entered into the polarization beam splitter 5. The incident light is divided by the polarization beam splitter 5 into two, i.e., the penetrating light into the P polarization light 23 and the reflection light into the S polarization light 24, respectively, and then the S polarization light 24 further enters into the each total reflection mirror 6. The S polarization light 24 is reflected upon the each total reflection mirror 6, and is directed into the first lens array 8. The S polarization light 24 is rotated in the polarization direction thereof by an angle of 90 degree through the $\lambda/2$ phase shifting plate 7 to be turned into the P polarization light, and then enters into the second lens array 10. At the same time, the first lens array 8 is so set that an image of the light emission portion of the light source 1 is formed at the position of the second lens array 9, thereby the width of luminous flux passing through the second lens array 9 is made small. As a result of this, it has a function of increasing the proportion of an amount of the light which passes through the second lens array 9.

Further, the second lens array 9 has the same number of lenses to those of the first lens array 8, corresponding to each of the lenses constructing it, respectively, and the those lenses on the second lens array 9, corresponding to them respectively, have a function of piling up and forming the images of the respective rectangular opening shapes of the lenses on the first lens array 8 on the liquid crystal display element 11. As a result of this, a shape of the light beam which irradiates the liquid crystal display element 11 comes to be a rectangular in the shape, thereby, almost flattening the distribution in intensity of the light over the region of the picture, increasing the ratio in illuminance at peripheral region of the picture with respect to the central region thereof so as to prevent the peripheral region of the picture from becoming dark, and realizing a picture being bright and clear over a whole screen.

As is mentioned in the above, by dividing the random polarization light beams emitted from the light source into the P polarization light and the S polarization light by means of the polarization beam splitter 5, and by constructing it with the first lens array 8 and the second lens array 9 which are composed of the condenser lenses corresponding to the respective polarization lights, the projection type liquid crystal display device can be obtained of small-sized and showing a good quality picture being flat in brightness over the whole screen thereof.

FIGS. 7(a), (b) and (c) show an example of shape or configuration of the first lens array in accordance with the present invention. As is shown in the same figure, each lens portions constructing the first lens array 8 has a rectangular opening in the shape thereof, therefore, it is possible to irradiate the liquid crystal display element 11 with a rectangular light spot. Further, black dots on the same figure indicate optical axes of respective lenses which construct the first lens array 8. By shifting the optical axis of each lens from the center of the rectangular shape thereof, the position of the condensed light on the second lens array 9 by means of the first lens array 8 can be controlled, therefore, by adjusting the positions of the optical axes appropriately, it is possible to increase an amount of light penetrating through the second lens array 9, while decreasing the second lens array 9 in the size thereof. On the surface of the first lens array 8 opposing to the condenser lenses, there is adhered the $\lambda/2$ phase shifting plate 7 at a hatched portion on the same figure, thereby the S polarization light reflecting upon the total reflection mirrors 6 and entering into the hatched portion is rotated in the polarization direction thereof by an angle of 90 degree through the $\lambda/2$ phase shifting plate 7 to be turned into the P polarization light.

FIGS. 8(a) and (b) show an example of shape or configuration of the second lens array in accordance with the present invention. As is shown in the same figure, the second lens array 9 in accordance with the present invention is constructed with lenses each having an opening shape of a polygon or a circle on the second lens array 9. In case where the lamp as shown in FIG. 3 mentioned in the above is used as the light source, it is usual that the cross-section of the light emission portion becomes elliptical in the shape, as a result thereof, an image formed from the light emission portion of the light source through the first lens array 8 on the second lens array 9 comes to be that near to an ellipse. Therefore, if making the lenses constructing the second lens array 9 rectangular in the shape thereof, there is caused much dead space where the light penetrating through it is small in the amount, thereby resulting drawbacks that the second lens array 9 must be large in the size and that the efficiency of light utilization comes to be small. In accordance with the present invention, by making the each opening shape of the lenses on the second lens array 9 polygonal or circular shape as shown in FIGS. 8(a) and (b), the dead space is small, thereby obtaining an irradiation means of high in the efficiency of light utilization, while keeping the device small in the size as a whole.

As mentioned in the above, in accordance with the present invention, by using the small-sized liquid crystal display element, the liquid crystal display device can be realized, being small in the size thereof and showing a picture of flat in brightness and quality thereof, over the whole screen thereof.

Next, explanation will be given in more detail of the embodiment.

Figure 9:
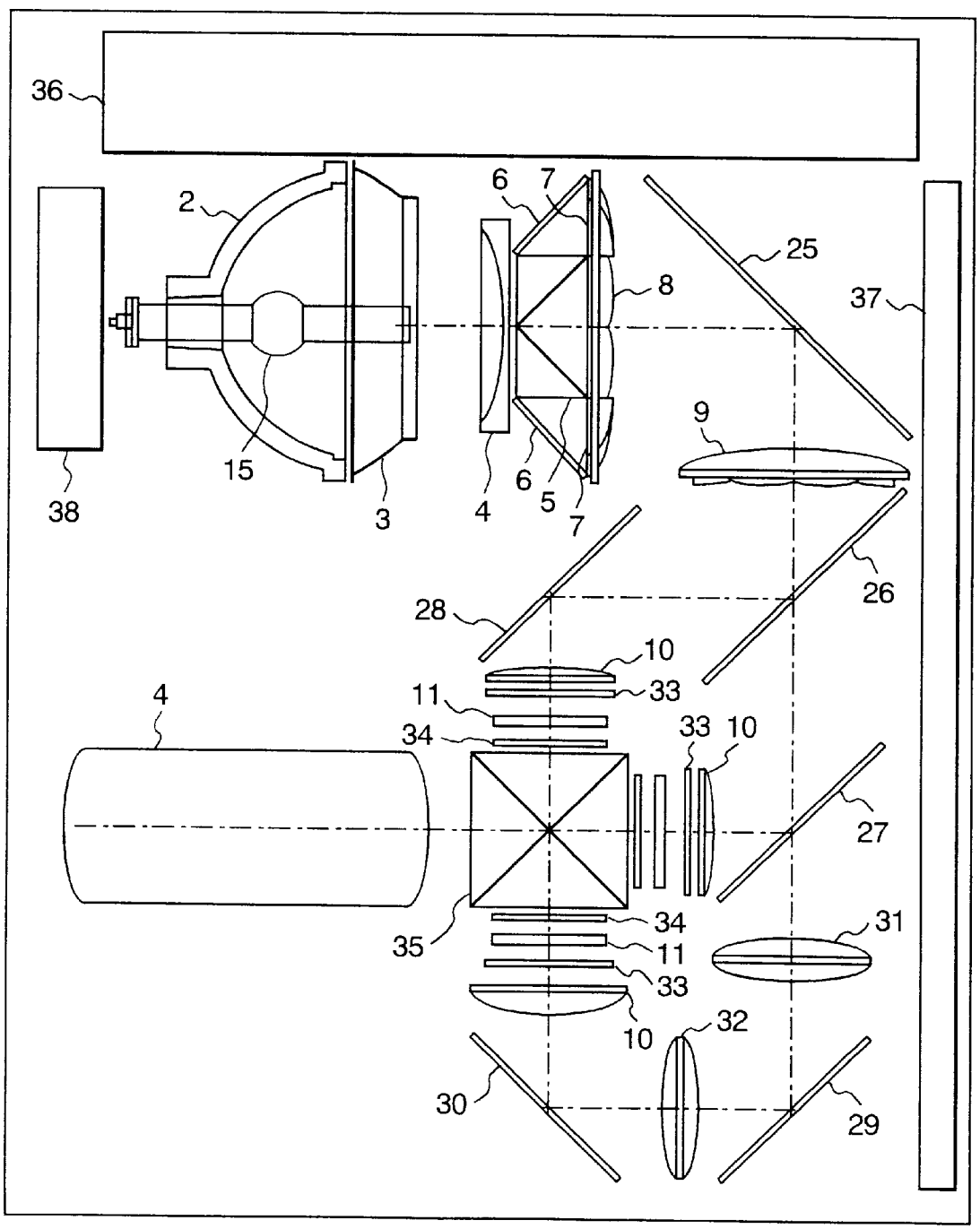
FIG. 9 is a view of showing further other embodiment of the projection type liquid crystal display device according to the present invention.

FIG. 9 is a view of showing an embodiment of the projection type liquid crystal display device in accordance with the present invention. The embodiment shown in FIG. 9 is a so-called a three plate type projection liquid crystal display device in which three liquid crystal display elements are used as the liquid crystal light bulb, corresponding to the three primary colors, R (Red), G (Green) and B (Blue), totally. In the present embodiment, the light beams emitted from the lamp, such as the metal halide lamp, after being reflected upon the surfaces of the elliptical mirror 2 or the spherical surface mirror 3, enter into the collimator lens 4 having a negative refraction power, to be aligned in parallel, and then enter into the polarization beam splitter 5. With the present embodiment, since the light beams emitted from the lamp 15 are aligned by the collimator lens 4 in parallel after being collected by the elliptical mirror 2, the polarization beam splitter 5 can be small-sized. In case of using a parabolic mirror in place of it, by collecting the light beams emitted from the parabolic mirror by means of a convex lens and then aligning them in parallel by means of the collimator lens 4, the polarization beam splitter 5 can also be made small-sized. The incident light is divided by the polarization beam splitter 5 into two, i.e., the penetration light into the P polarization light and the reflection light into the S polarization light. The P polarization light enters into the first lens array 8, and the S polarization light directs into the total reflection mirror 6. The S polarization light ray reflecting upon the each total reflection mirror 6 enters into the first lens array 8, and is rotated in the polarization direction by an angle of 90 degree through the λ/2 phase shifting plate 7 to be turned into the P polarization light. The light penetrating, through the first lens array 8 is bent in the optical path thereof by an angle of 90 degree upon the total reflection mirror 25, and passes through the second lens array 9. Thereafter, by the dichroic mirror 26 for penetrating R (Red) and G (Green) colors, which is positioned declining by an angle of 45 degree with respect to the optical axis, the B (Blue) light is reflected while the lights of R (Red) and G (Green) colors are passing therethrough. The reflected ray of B (Blue) light is bent in the optical path thereof by an angle of 90 degree upon the total reflection mirror 28, and passes through the condenser lens 10 and the polarization plate 33 at the incident side. Then, it enters into the liquid crystal display element 11 which is constructed with the opposing electrodes, the liquid crystal, etc., and passes through the polarization plate 34 which is provided at the exit or radiation side of the liquid crystal display element 11. The B light ray exiting from the polarization plate 34 at the radiation side is reflected upon the dichroic prism 35 and is entered into the projection means 4, such as the zoom lens.

While, the R light ray and the G light ray, which penetrate through the R and G penetrating dichroic mirror 26, enter into the G reflection dichroic mirror 27 to be reflected thereby, and passes through the condenser lens 10 and the polarization plate 33 at the incident side thereof. Then, the light rays enter into the liquid crystal display element 11, and pass through the polarization plate 34 which is provided at the radiation side of the liquid crystal display element 11. The G light emitted from the polarization plate 34 at the radiation side penetrates through the dichroic prism having a function of penetrating the G light, and enters into the projection means 4 together with the B ray of the light. Further, the R ray of light passing through the G reflection dichroic mirror 27 passes through a relay lens 31, and after being bent in the optical path by an angle of 90 degree upon the total reflection mirror 29, is further bent in the optical path by an angle of 90 degree upon the total reflection mirror 30. Then, it further passes through the condenser lens 10 and the polarization plate 33 at the incident side, and enters into the liquid crystal display element 11, thereafter it passes through the polarization plate 34 which is provided at the radiation side thereof. The R ray of light radiating from the polarization plate 34 at the radiation side thereof, after being reflected upon the dichroic prism 35 having a function of reflecting the R ray of light, enters into the projection means 4 together with the G ray of the light and the B ray of the light.

From the above, the rays of light corresponding to the R, G and B colors, being divided and combined by a color separation means and a color composing means, enlarges the picture on the liquid crystal display element corresponding to the R, G and B colors by means of the projection means 4, thereby obtaining a real image on a screen which is enlarged and composed by the pictures of respective colors. A reference numeral 36 in the same figure indicates a circuit of electric power source and 37 a circuit for picture signal, and a blowoff fan 38 has a function of guiding the heat being generated by the light source to the outside.

Further, with the embodiment according to the present invention, since the rays of the light emitted from the random light source are aligned in one direction by the polarization means, only a small amount of heat is generated in the polarization plate 33 at the incident side thereof. Therefore, a polarization plate can be made of iodine, which shows a low heat resistance temperature but high in the transparency, thereby further improvement in the efficiency of light utilization can be obtained.

By positioning the light source and the projection means in such manner that the respective optical axes thereof are aligned in parallel to each other, and further by positioning the electric power source circuit 36 and the picture signal circuit 37 through a color separation and combination unit which is formed from the color separation means, as well as the liquid crystal display element and the color composition means mentioned in the above, as show in the same figure, the device can be small-sized as a whole.

Generally, audiences see and hear the projection type liquid crystal display device from the rear portion thereof, however, because the heat generating at the light source is guided to the side of the projection means, no hot air or wind hits on the audiences, thereby uncomfortable heat and fan noise can be reduced.

The lamp 15 in the present embodiment is such the metal halide lamp as shown in FIG. 3. However, the function of the irradiation means including the lamp is same as mentioned in the above, therefore detailed explanation of it is omitted here.

Further, as the liquid crystal display element 11 in the present invention, for an example, a transparent type liquid crystal panel of p-Si TFT, of a class of 1 inch diagonal length is used so as to realize the small-sizing of the device as a whole. In the liquid crystal display element 11 mentioned in the above, there are provided an incident side polarization plate 33 as a polarization element for passing a straight line polarization light, and also a radiation side polarization plate 34 as another polarization element for passing a straight line polarization light having the polarization plane being rotated by an angle of 90 degree with respect to the incident side polarization plate 33, respectively, at the incident side and the radiation side of the display element, and, further by combining the function of rotating the polarization plane due to the electro-optic effect in the liquid crystal display element 11 and the function of selecting the polarization component with the incident side polarization plate 33 and the radiation side polarization plate 34, both constructing the polarization elements mentioned in the above, the amount of the penetrating light of the incident light is controlled so as to display the picture information.

Furthermore, in the construction of the present invention, in order to increase or improve the uniformity in illuminance of a picture or the efficiency in light utilization, it is effective to make any one or more of the elliptical mirror 2, the spherical mirror 3, the first lens array 8, the second lens array 9, and the condenser lens 10 have an aspherical shape in which the shape of peripheral portion is changed with respect to the near to the axis. For example, in case where a central portion of the optical axis of the condenser lens 10 or the relay lens 31 or 32 is so shaped that it has the aspherical configure near to be a plane, the ratio in the illuminance of the peripheral portion to the center is further increased, thereby the uniformity in the illuminance of the screen is improved. And, in the first lens array 8, by changing the focus distance of each of the condenser lenses independently, it is possible to make small the secondary image of the light source which is formed on the second lens array 9, thereby enabling improvement in the efficiency of light utilization therein.

Further, in the first lens array 8, by making the both surfaces thereof into a convex lens shape or a toric lens shape, or by positioning the convex lenses or the toric lenses in front of the first lens array 8, it is also possible to make small the secondary image of the light source which is formed on the second lens array 9, thereby enabling an improvement in the efficiency of the light utilization therein.

Further, also in the second lens array 9, by changing the focus distance of each of the condenser lenses independently, the shape of the light irradiating the liquid crystal display element 11 can be made suitable, thereby enabling the realization of a clear picture in which the ratio in the illuminance is high with respect to that at the center while maintaining the uniformity in the distribution of intensity of the light, as well as improving the efficiency in the utilization of light therein. And, also in the second lens array 9, by making the both surfaces thereof the convex lens shape or the toric lens shape, or by positioning the convex lenses or the toric lenses in front of the first lens array 8, it is possible to make suitable the shape of the light irradiating the liquid crystal display element 11, and further to realize a clear picture in which the ratio in the illuminance is high with respect to that at the center while maintaining the uniformity in the distribution of intensity of the light, as well as to increase the efficiency in utilization of light therein.

Further, in the present embodiment, the $\lambda/2$ phase shifting plate 7 is positioned beside the first lens array 8 at the side of polarization beam splitter 5, however, it is also possible to obtain the same effect even if the $\lambda/2$ phase shifting plate 7 is positioned between the polarization beam splitter 5 and the first lens array 8, or between the first lens array 8 and the second lens array 9, or between the second lens array 9 and the condenser lens 10.

As is mentioned in the above, according to the present invention, it is possible to realize a small-sized projection type liquid crystal display device showing a bright picture and good in quality thereof, with obtaining the high efficiency in utilization of light.

The present invention can be practiced in other embodiments or forms without exceeding the sprits or main features thereof. Accordingly, the embodiment mentioned in the above is only one example of the present invention in all respects thereof, and it should not be interpreted restrictedly. Breadth of the present invention is indicated or defined by the pending claims. Further, various modifications and/or variations belonging to the equivalent of the pending claims are all inside of the breadth of the present invention.

What is claimed is:

1. A projection type liquid crystal display device, including:

irradiation means having a function of irradiating light emitted from a light source upon an irradiated surface;

a liquid crystal display element for modulating the light; and projection means for projecting the light emitted from said liquid crystal display element, wherein said irradiation means comprises:

at least one reflection mirror positioned to reflect light from said light source to an irradiated surface;

a polarization beam splitter for dividing the light from the light source into P polarization light and S polarization light;

a $\lambda/2$ phase shifting plate for rotating a direction of polarization of either one of the P polarization and the S polarization lights;

polarization means being constructed with a reflection mirror for reflecting either one of the P polarization and the S polarization lights;

a first lens array being constructed with a plurality of condenser lenses, for collecting the light emitted from said polarization means so as to form a plurality of secondary light source images; and a second lens array being constructed with a plurality of condenser lens and positioned near where the plurality of secondary light source images are formed, wherein said first lens array of said irradiation means is constructed with lenses, each of which is rectangular in shape and includes an optic axis being positioned out of a center of said rectangular shape.

2. A projection type liquid crystal display device, including:

irradiation means having a function of irradiating light emitted from a light source upon an irradiated surface;

a liquid crystal display element for modulating the light; and projection means for projecting the light emitted from said liquid crystal display element, wherein said irradiation means comprises:

at least one reflection mirror positioned to reflect light from said light source to an irradiated surface;

a polarization beam splitter for dividing the light from the light source into P polarization light and S polarization light;

polarization means being constructed with a reflection mirror for reflecting either one of the P polarization and S polarization lights;

a first lens array being constructed with a plurality of condenser lenses, for collecting the light exited from said polarization means so as to form a plurality of secondary light source images, and further provided with a λ/2 phase shifting plate positioned at an incident light side or an emission light side where either the P polarization light or the S polarization light of the light emitted from said polarization means enters; and a second lens array being constructed with a plurality of condenser lenses and positioned near where the plurality of secondary light source images are formed;

wherein said first lens array of said irradiation means is constructed with lenses, each of which has a rectangular shape and includes an optic axis being positioned out of a center of said rectangular shape.

3. A projection type liquid crystal display device, including:

irradiation means having a function of irradiating light emitted from a light source upon an irradiated surface;

a liquid crystal display element for modulating the light; and projection means for projecting the light emitted from said liquid crystal display element, wherein said irradiation means comprises:

at least one reflection mirror positioned to reflect light from said light source to an irradiated surface;

a polarization beam splitter for dividing the light from the light source into P polarization light and S polarization light;

polarization means being constructed with a reflection mirror for reflecting either one of the P polarization and S polarization lights;

a first lens array being constructed with a plurality of condenser lenses, for collecting the light emitted from said polarization means so as to form a plurality of secondary light source images; and a second lens array being constructed with a plurality of condenser lenses and positioned near where the plurality of secondary light source images are formed, and further provided with a λ/2 phase shifting plate positioned at an incident light side surface or an emission light side surface where either the P polarization light or the S polarization light of the light emitted from said polarization means enters;

wherein said first lens array of said irradiation means is constructed with lenses, each of which has a rectangular shape and includes an optic axis being positioned out of a center of said rectangular shape.

4. A projection type liquid crystal display device as defined in claim 1, wherein said second lens array of said irradiation means is constructed with at least a lens, which has a rectangular in shape thereof and includes an optic axis being positioned out of a center of said rectangular shape thereof.

5. A projection type liquid crystal display device as defined in claim 2, wherein said second lens array of said irradiation means is constructed with at least a lens, which has a rectangular in shape thereof and includes an optic axis being positioned out of a center of said rectangular shape thereof.

6. A projection type liquid crystal display device as defined in claim 3, wherein said second lens array of said irradiation means is constructed with at least a lens, which has a rectangular in shape thereof and includes an optic axis being positioned out of a center of said rectangular shape thereof.

7. A projection type liquid crystal display device as defined in claim 1, wherein said first lens array has at least two kinds of lenses having different focus distances.

8. A projection type liquid crystal display device as defined in claim 2, wherein said first lens array has at least two kinds of lenses having different focus distances.

9. A projection type liquid crystal display device as defined in claim 3, wherein said first lens array has at least two kinds of lenses having different focus distances.

10. A projection type liquid crystal display device as defined in claim 1, wherein said second lens array has lenses each having different focus distances.

11. A projection type liquid crystal display device as defined in claim 2, wherein said second lens array has lenses each having different focus distances.

12. A projection type liquid crystal display device as defined in claim 3, wherein said second lens array has lenses each having different focus distances.

13. A projection type liquid crystal display device as defined in claim 1, wherein a lens having a negative refracting power is positioned between said reflection mirror and said polarization means.

14. A projection type liquid crystal display device as defined in claim 2, wherein a lens having a positive refracting power is positioned between said polarization means and said first lens array.

15. A projection type liquid crystal display device as defined in claim 2, wherein a toric lens is positioned between said polarization means and said first lens array.

* * * * *